United States Patent
Anderson et al.

(10) Patent No.: US 9,161,419 B2
(45) Date of Patent: Oct. 13, 2015

(54) INTELLIGENT AND COORDINATED LIGHTING OF A LIGHTING DEVICE

(75) Inventors: Jason L. Anderson, San Jose, CA (US); Gregory J. Boss, Saginaw, MI (US); Jeffrey L. Coveyduc, San Jose, CA (US); Stefan A. G. van der Stockt, Johannesburg (ZA)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 13/540,012

(22) Filed: Jul. 2, 2012

(65) Prior Publication Data

US 2014/0001961 A1    Jan. 2, 2014

(51) Int. Cl.
    *H05B 37/02*        (2006.01)
    *H05B 37/03*        (2006.01)

(52) U.S. Cl.
    CPC ........ *H05B 37/0227* (2013.01); *H05B 37/0272* (2013.01); *H05B 37/034* (2013.01); *Y02B 20/48* (2013.01)

(58) Field of Classification Search
    CPC ...................................................... H05B 37/02
    USPC .......................................................... 315/153
    See application file for complete search history.

(56) References Cited

U.S. PATENT DOCUMENTS

| | | | |
|---|---|---|---|
| 5,089,805 A * | 2/1992 | Salsman | 340/467 |
| 5,426,574 A | 6/1995 | Carolfi | |
| 5,508,589 A | 4/1996 | Archdekin | |
| 6,035,266 A | 3/2000 | Williams et al. | |
| 7,254,372 B2 | 8/2007 | Janusz et al. | |
| 7,315,241 B1 | 1/2008 | Daily et al. | |
| 7,333,903 B2 * | 2/2008 | Walters et al. | 702/64 |
| 7,431,489 B2 | 10/2008 | Yeo et al. | |
| 7,546,167 B2 | 6/2009 | Walters et al. | |
| 7,591,570 B2 | 9/2009 | Holder et al. | |
| 7,775,692 B2 | 8/2010 | Li | |
| 7,817,063 B2 | 10/2010 | Hawkins et al. | |
| 8,138,690 B2 * | 3/2012 | Chemel et al. | 315/318 |
| 8,476,565 B2 * | 7/2013 | Verfuerth | 250/205 |
| 8,766,545 B2 * | 7/2014 | Wilsher et al. | 315/153 |
| 2005/0054292 A1 * | 3/2005 | Janusz et al. | 455/41.2 |
| 2011/0133655 A1 * | 6/2011 | Recker et al. | 315/159 |
| 2012/0242880 A1 * | 9/2012 | Kubo | 348/333.1 |

FOREIGN PATENT DOCUMENTS

JP          2005100765 A     4/2005

\* cited by examiner

*Primary Examiner* — Ryan Jager
(74) *Attorney, Agent, or Firm* — Yee & Associates, P.C.; Parashos T. Kalaitzis (57) ABSTRACT

Intelligent lighting is provided to motorists traveling down a stretch of road by sequentially turning on adjacent lighting devices in a lighting segment only when required, such as when vehicles are approaching the lighting devices, and turning off the lighting devices or decreasing a light intensity output of the lighting devices to a predefined minimum lighting intensity output level when no vehicles are present. In addition, which bulb to use in a multi-bulb lighting device is determined, as well as the optimal lighting intensity level of the selected bulb. Further, it is determined which lighting devices in a lighting segment may be turned off or dimmed while maintaining a predefined minimum safe light/brightness level along a pathway associated with the lighting segment.

19 Claims, 7 Drawing Sheets

702 {
Peer-to-peer algorithm:
Car lighting (int X, int Y)
1) Set default light intensity level, establish communication with all defined peers (pre-loaded in sequence)
    lighting_interval = X;
    time_out = Y;

704 {
2) While (true) {
    sleep 1 second;
    If incoming car detected by sensor (with no peer info i.e. new car in lighting system)
        Set light intensity level accordingly
        Communicate information to all defined peers
    If incoming car detected from peer information "from the left"
        Determine how many peers away car is = number of peers_away
        If (peers_away <= lighting_interval)
            Set light intensity level accordingly to provide optimal lighting
        Transmit information to peers in rolling window of light "to the right"

If incoming car detected from peer information "from the right"
        Determine how many peers away car is = number of peers_away
        If (peers_away <= lighting_interval)
            Set light intensity level accordingly to provide optimal lighting
        Transmit information to peers in rolling window of light "to the left"

If no car detected by sensor AND no incoming car info via peer AND time_out time reached
        Set light intensity level to minimum defined level (could be zero i.e. off)
} //end while

FIG. 7

INTELLIGENT AND COORDINATED LIGHTING OF A LIGHTING DEVICE

BACKGROUND

1. Field

The disclosure relates generally to a method, data processing system, and computer program product for automatic intelligent and coordinated lighting of a lighting device in a lighting system.

2. Description of the Related Art

Street lighting helps to prevent accidents and increase safety. Studies show that darkness results in a larger number of crashes and fatalities. Currently, street lights are turned on at sunset and turned off in sunrise. Some more advanced street lights have an ambient light sensor that automatically turns on the light during decreased ambient lighting conditions, such as during bad weather, and turns the light off when ambient lighting conditions are increased. It is common for street lights to be attached to poles, such as telephone poles or utility poles, which have electrical wiring strung between them.

SUMMARY

According to one embodiment of the present invention, a method for automatically lighting a lighting device is provided. In response to a data processing system, which is located in the lighting device, determining that an ambient light level is less than or equal to a predetermined minimum ambient light level threshold value, the data processing system sets a lighting intensity level of a lighting element located in the lighting device to a first lighting intensity level. Then, the data processing system receives information regarding an approaching object from a peer lighting device within a plurality of peer lighting devices associated with the lighting device. The data processing system determines whether the approaching object is within a lighting interval of the lighting device based on the information regarding the approaching object received from the peer lighting device. In response to the data processing system determining that the approaching object is within the lighting interval of the lighting device based on the information regarding the approaching object received from the peer lighting device, the data processing system sets the lighting intensity level of the lighting element to a second lighting intensity level. In other embodiments of the present invention, a data processing system and a computer program product for automatically lighting a lighting device are provided.

DETAILED DESCRIPTION

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
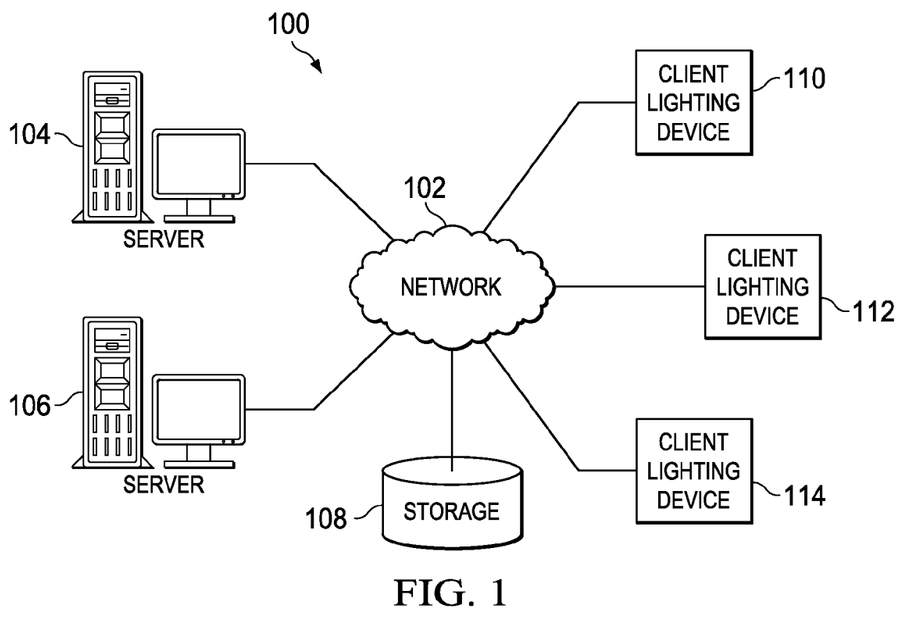
FIG. 1 is a pictorial representation of a network of data processing systems in which illustrative embodiments may be implemented.
Figure 2:
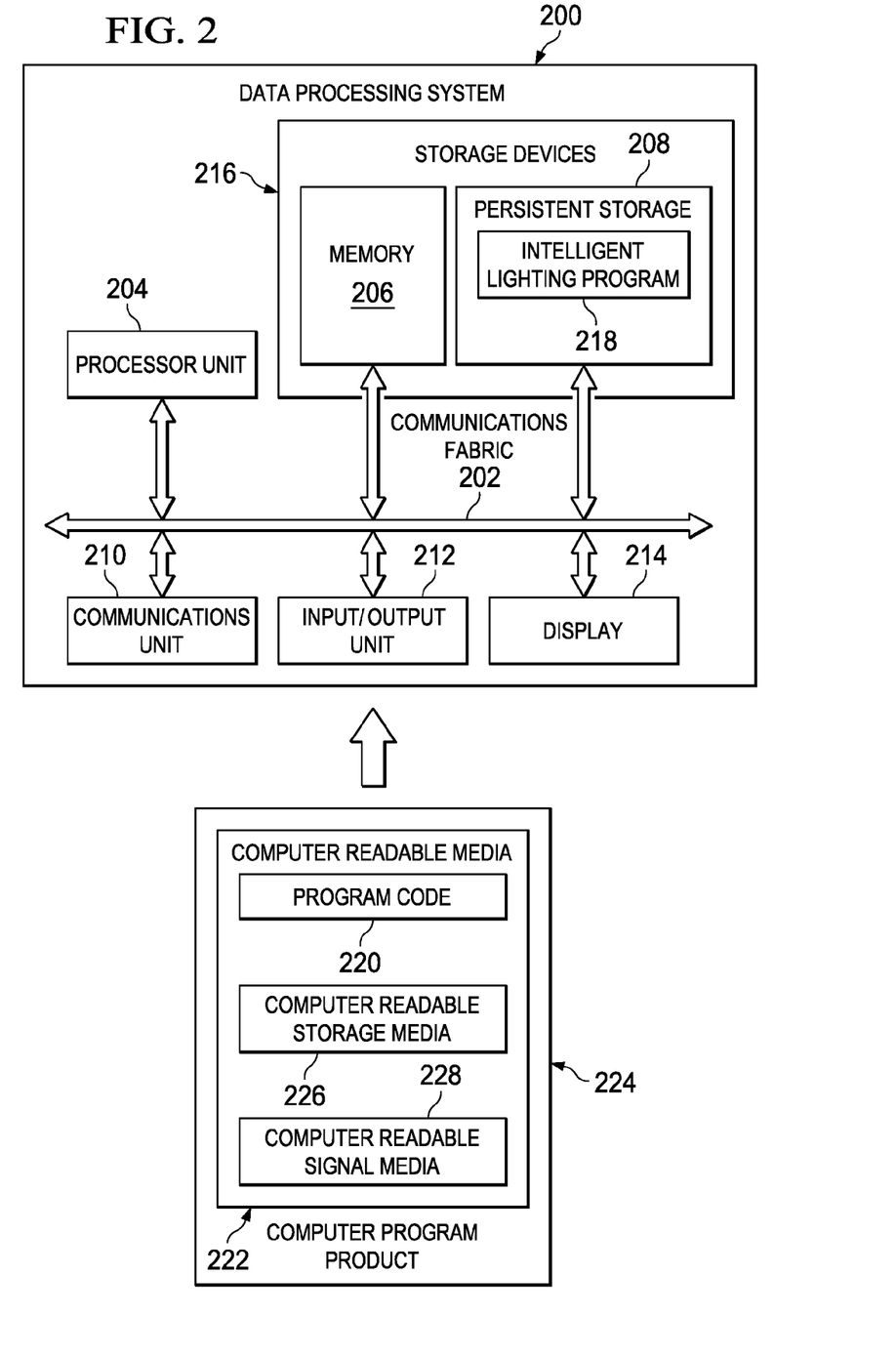
FIG. 2 is a diagram of a data processing system in which illustrative embodiments may be implemented.
Figure 3:
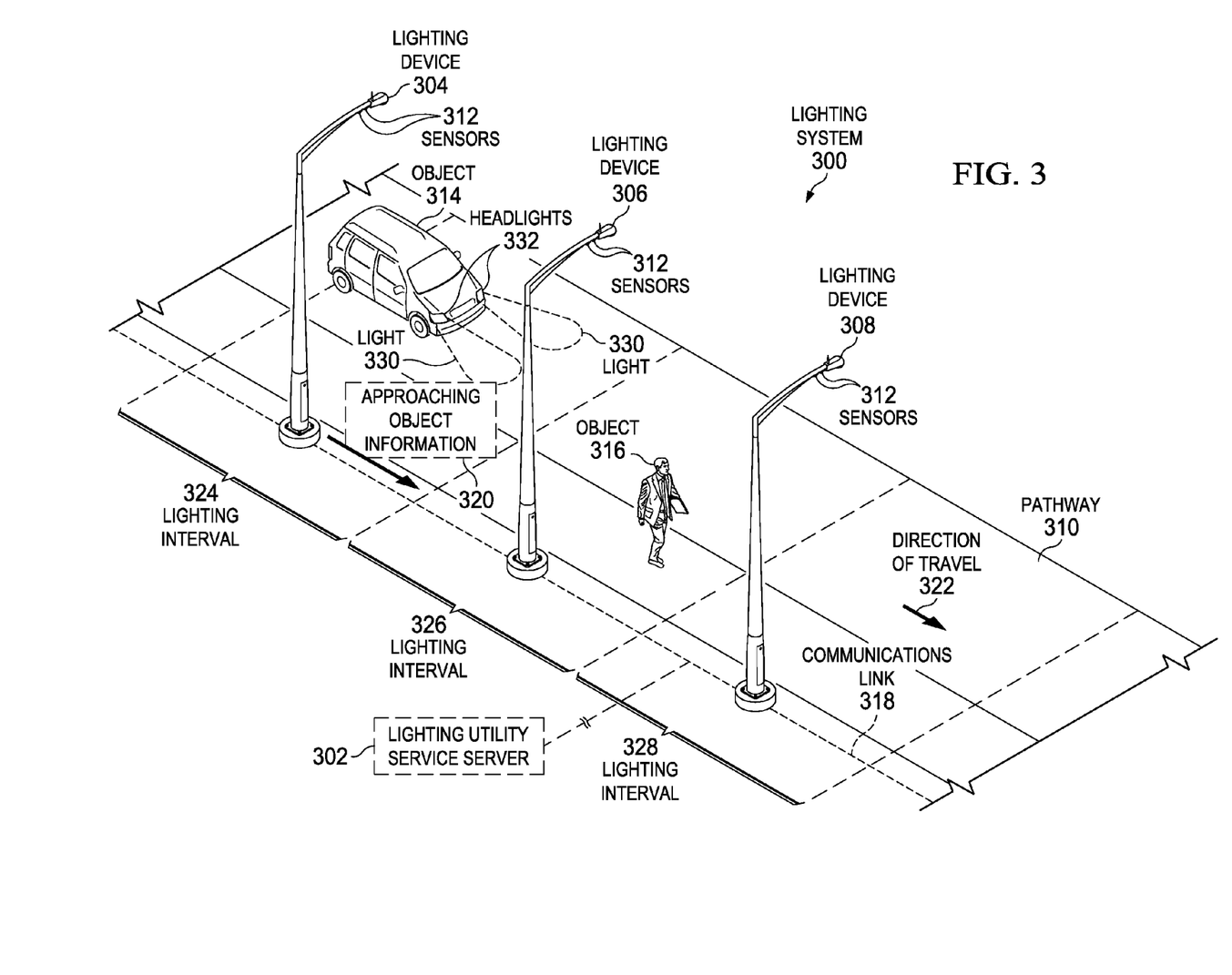
FIG. 3 is a diagram illustrating an example of a lighting system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other various devices connected together within network data processing system 100. Network 102 may include connections, such as wire, wireless communication links, or fiber optic cables.

In the depicted example, server 104 and server 106 connect to network 102, along with storage unit 108. Server 104 and server 106 may be, for example, lighting utility service server devices with high speed connections to network 102. Server 104 and server 106 may reside, for example, within a public lighting utility system and represent a plurality of lighting utility service servers. In this example, the public lighting utility system uses server 104 and server 106 to monitor and control lighting that is provided by a plurality of client lighting devices, such as client lighting devices 110, 112, and 114.

Storage unit 108 is a network storage device capable of storing data in a structured or unstructured format. Storage unit 108 may be, for example, a network storage device that provides storage of current lighting utility usage data, historical lighting utility usage data that may include bulb lighting intensity output level and temperature of each client lighting device in each particular lighting segment within a lighting system, peer-to-peer client lighting device lighting algorithms, predefined ambient lighting level threshold values, lighting level calculations, defined minimum lighting levels of particular client lighting devices of a lighting system, historical traffic patterns of vehicles and pedestrians in each particular lighting segment within a lighting system, historical accident patterns of vehicles and pedestrians in each particular lighting segment within a lighting system, programs to calculate object direction of travel, distance, and speed, and the number of lighting devices and the position of each lighting device included in a particular lighting segment within a plurality of lighting segments of the lighting system. Further, it should be noted that storage unit 108 may store other data, such as, for example, security access information, such as user identification and passwords, which a system administrator uses to access the public lighting utility system.

Client lighting devices 110, 112, and 114 also connect to network 102. Client lighting devices 110, 112, and 114 are clients to server 104 and server 106. In the depicted example, server 104 and server 106 may provide information, such as boot files, operating system images, and applications to client lighting devices 110, 112, and 114. In this example, client lighting devices 110, 112, and 114 are physical devices that emit light. Each of client lighting devices 110, 112, and 114 emit light to a defined area along a pathway. Client lighting devices 110, 112, and 114 may each represent a set of one or more lighting devices. Each set of lighting devices is included in a lighting segment within a plurality of lighting segments of the public lighting utility system.

The lighting devices may be, for example, variable intensity lamps or any other types of lighting apparatuses capable of providing a plurality of different lighting intensity output levels to a defined area. A lighting intensity output level is an amount of light energy or brightness that a lighting device produces or emits during a particular time interval. Client lighting devices 110, 112, and 114 may increase or decrease lighting intensity output levels in response to ambient lighting conditions and/or approaching objects. A defined area is a specific location along a pathway that a particular set of lighting devices provides light to. A pathway is a route along which a vehicle or pedestrian travels. The pathway may be, for example, an interstate, a highway, a street, a road, an alley, a bicycle path, a walking/jogging path, a sidewalk, a stairway, a train track, a subway track, a river, a canal, a stream, an airport runway, or any combination thereof. A vehicle is a means of transportation of people and/or goods. The vehicle may be, for example, a semi tractor-trailer, a truck, a bus, a car, a motorcycle, a bicycle, a tricycle, a scooter, a train, a subway, a watercraft, or an aircraft. Also, for the purposes of this specification, a vehicle may represent a set of one or more vehicles. A pedestrian is a person that is traveling on foot. However, it should be noted that the definition of a pedestrian in this specification also may include an animal.

In addition, each of client lighting devices 110, 112, and 114 includes a data processing system that processes incoming data from a set of one or more sensors in order to provide intelligent and coordinated lighting to their respective defined areas along the pathway. Further, it should be noted that client lighting devices 110, 112, and 114 may communicate with one another using peer-to-peer communication protocols.

The peer-to-peer communication may be via wired, wireless, or a combination of wired and wireless communication links. Furthermore, it should be noted that network data processing system 100 may include additional server devices, client lighting devices, and other devices not shown.

Program code located in network data processing system 100 may be stored on a computer recordable storage medium and downloaded to a computer or other data processing device for use. For example, program code may be stored on a computer recordable storage medium on server 104 and downloaded to client lighting device 110 over network 102 for use on client lighting device 110.

In the depicted example, network data processing system 100 may be implemented as a number of different types of networks, such as for example, an internet, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer in which computer readable program code or instructions implementing processes of illustrative embodiments may be located. Data processing system 200 may be located within, for example, a client lighting device, such as client lighting device 110 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, computer readable program code in functional form, and/or other suitable information either on a transient basis and/or a persistent basis. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores intelligent lighting program 218. Data processing system 200 utilizes intelligent lighting program 218 to control the light output of a lighting device that data processing system 200 is located within. In addition, data processing system 200 utilizes intelligent lighting program 218 to coordinate the light output of the lighting device with other peer lighting devices corresponding to a same lighting segment in the lighting system. Intelligent lighting program 218 calculates ambient lighting levels, calculates the current lighting level output of the lighting device based on the current ambient lighting level and approaching objects, calculates the direction, distance, and speed of the approaching objects, and determines the number and location of each peer lighting device included within the same lighting segment of the lighting system.

Communications unit 210, in this example, provides for communication with other data processing systems, such as server 104 in FIG. 1, and other peer lighting devices, such as client lighting devices 112 and 114 in FIG. 1. In this example, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard and/or some other suitable input device. Further, input/output unit 212 may send output to a printer. Display 214 provides a mechanism to display information to a user. It should be noted that input/output unit 212 and display 214 may be optional components of data processing system 200.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by processor unit 204. The program code, in the different embodiments, may be embodied on different physical or computer readable storage media, such as memory 206 or persistent storage 208.

Program code 220 is located in a functional form on computer readable media 222 that is selectively removable and may be loaded onto or transferred to data processing system 200 for running by processor unit 204. Program code 220 and computer readable media 222 form computer program product 224. In one example, computer readable media 222 may be computer readable storage media 226 or computer readable signal media 228. Computer readable storage media 226 may include, for example, an optical or magnetic disc that is inserted or placed into a drive or other device that is part of persistent storage 208 for transfer onto a storage device, such as a hard drive, that is part of persistent storage 208. Computer readable storage media 226 also may take the form of a persistent storage, such as a hard drive, a thumb drive, or a flash memory that is connected to data processing system 200. In some instances, computer readable storage media 226 may not be removable from data processing system 200.

Alternatively, program code 220 may be transferred to data processing system 200 using computer readable signal media 228. Computer readable signal media 228 may be, for example, a propagated data signal containing program code 220. For example, computer readable signal media 228 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 220 may be downloaded over a network to persistent storage 208 from another device or data processing system through computer readable signal media 228 for use within data processing system 200. For instance, program code stored in a computer readable storage media in a server data processing system may be downloaded over a network from the server to data processing system 200. The data processing system providing program code 220 may be a server computer, a client computer, or some other device capable of storing and transmitting program code 2206.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 222 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

During the course of developing illustrative embodiments it was discovered that lighting devices along a pathway, such as a street or sidewalk, are turned on no matter if the lighting devices are being used or not. For example, if no vehicles or pedestrians are present along the pathway, the lighting devices are still turned on. In addition, the lighting devices are turned on at full intensity or brightness. From the perspective of a total lighting system, such as a whole network of city street lights, this constitutes increased power consumption as well as more frequent bulb replacements, which leads to higher total costs.

Illustrative embodiments control a network of multiple lighting devices that are capable of emitting light at multiple lighting intensity output levels and are interconnected via peer-to-peer communication. The peer-to-peer communication protocol between the plurality of lighting devices allows for the sharing of environmental data, such as ambient light levels, and lighting device state data of each lighting device in the same peer group or lighting segment. Also, illustrative embodiments utilize external lighting device sensors to detect approaching objects, such as vehicles, pedestrians, and animals, the direction of travel of the approaching objects, the distance of the approaching objects from the lighting devices, and the speed of travel of the approaching objects to provide input data to a data processing system. The data processing system interprets the input data to control a set of one or more lighting devices in a lighting segment along a pathway based on defined lighting intervals of the lighting devices.

For example, illustrative embodiments provide intelligent lighting to motorists traveling down a stretch of road by sequentially turning on adjacent lighting devices in a lighting segment only when required, such as when one or more vehicles are approaching the lighting devices, and turning off the lighting devices or decreasing a light intensity output of the lighting devices to a predefined minimum lighting intensity output level when no vehicles are present. In addition, illustrative embodiments determine the optimal bulb in a multi-bulb lighting device to use, as well as the optimal lighting intensity level of the selected bulb. Further, illustrative embodiments determine which lighting devices in a lighting segment may be turned off or dimmed while maintaining a predefined minimum safe light/brightness level along a pathway associated with the lighting segment. Typically, the defined minimum safe light/brightness level is defined by a governmental agency for safety purposes and/or environmental purposes.

Thus, illustrative embodiments dynamically turn on lights only when needed, which saves on power and on maintenance time and costs. As a result, illustrative embodiments will significantly decrease power consumption on quiet and semi-quiet streets, as well as during times of low traffic, such as during the early morning hours. Illustrative embodiments utilize different lighting intensity output levels depending on the current ambient light level. The different lighting intensity output levels provide optimal lighting when a plurality of lighting devices are sequentially turned on at different lighting intensity levels producing a rolling window of light along a pathway. Also, illustrative embodiments provide an ability to approximate the duration of time a lighting device will be turned on, such as, for example, 60 seconds for 10 vehicles to pass the lighting device, and to selectively choose a different bulb in a multi-bulb lighting device based on the duration of burn to achieve increased energy savings.

In the case of a multi-bulb lighting device, a data processing system located in the lighting device will determine which bulb to turn on. For example, if the data processing system determines that the lighting device will be on for a few seconds only, the data processing system will select a bulb that does not require a long startup time, such as a high pressure sodium bulb, but will instead select a bulb with the least energy cost for the expected burn duration. In some cases this may be incandescent or halogen bulb, even though the high pressure sodium bulb is much more common and efficient in the long term.

One goal of illustrative embodiments is to keep a majority of the lighting devices in a lighting segment turned off if there are no vehicles present within the lighting segment while still maintaining a predefined minimum lighting intensity level for that lighting segment. Illustrative embodiments turn on the lighting devices if and only if one or more vehicles are present within the lighting segment and turn those lighting devices off again once the vehicles have passed. Illustrative embodiments optimize the minimum lighting intensity level of ambient light based on the light provided by the one or more vehicles traveling within the lighting segment. Illustrative embodiments utilize a distributed peer-to-peer communications system to alert neighboring peer lighting devices of approaching vehicles and to suggest lighting configurations to the neighboring peer lighting devices.

Main components of illustrative embodiments may include: 1) lighting devices that provide multiple lighting intensity levels using either a single variable intensity bulb or a multi-bulb configuration; 2) a sequence of lighting devices that are connected as peer lighting devices within a defined lighting segment using peer-to-peer communication; 3) a peer-to-peer communication protocol that is used to share environmental data and lighting device state data between peer lighting devices; 4) external sensors, such as, for example, infra-red motion sensors and ambient light sensors, which are used to detect approaching vehicles and ambient lighting levels; and 5) a data processing system in the lighting devices to interpret the environmental data and information obtained from peer lighting devices in order to automatically turn on lighting devices sequentially producing a rolling window of light along a pathway based on defined lighting intervals of the lighting devices.

Lighting devices in a sequence of lighting devices may be set at a predefined minimum lighting intensity level using, for example, a low power LED lighting element by default, with designated master lighting devices in the sequence at every n-th lighting interval. The master lighting devices may be set at a higher lighting intensity level than the other lighting devices in the sequence, but not set at the maximum lighting intensity level of the master lighting devices. Turning on the maximum lighting intensity level or turning on a combination of all the lighting intensity levels of the lighting devices is controlled by a combination of data inputs from the peer-to-peer network, such as, for example, data inputs of approaching vehicles into a particular lighting segment, as well as data inputs of a lighting device's own external sensors. Using these data inputs, a data processing system located in the lighting devices decides which lighting intensity output level should be used.

The data processing system may get approaching vehicle information from peer lighting devices N number of lighting devices to the left/right in the lighting segment, where N may be equal to a value such as 5, 10, 20, et cetera. The peer-to-peer networking capability may be enabled by existing technologies, such as Ethernet networking, wireless networking, Ethernet over power line, or similar technologies. A vehicle may enter the sequence of lighting devices at any point, in which case a particular lighting device where the vehicle entered the sequence will: 1) detect the vehicle using motion and/or ambient light sensors; 2) adjust that particular lighting device's own ambient light level accordingly; and 3) send approaching vehicle information to all peer lighting devices located in a same direction of travel as the vehicle that entered the sequence of lighting devices.

A lighting device uses the peer-to-peer network to exchange information about the environment, such as, for example the presence of an approaching vehicle, the calculated speed of the approaching vehicle using mathematical formulae with data inputs from peer lighting devices, the detected ambient lighting conditions when the approaching vehicle is at various distances from the lighting device, et cetera. The peer-to-peer communication protocol allows any specific lighting device to: use any environmental information obtained from other peer lighting devices in the same lighting segment, which allows the lighting device's data processing system to turn on lighting elements at a specific lighting intensity output level and for a specified period of time (i.e., to allow a minimum ambient lighting level based on peer information, as well as to produce a rolling window of light along a pathway); relay information from a peer on one side of the lighting device to a peer on the other side of the lighting device; and synchronize control information with other peer lighting devices, such as, for example, "I am your peer lighting device, with you at position P in the sequence from me—please send me your environmental information."

Thus, illustrative embodiments of the present invention provide a method, data processing system, and computer program product for automatic intelligent and coordinated lighting of a lighting device in a lighting system. In response to a data processing system, which is located in the lighting device, determining that an ambient light level is less than or equal to a predetermined minimum ambient light level threshold value, the data processing system sets a lighting intensity level of a lighting element located in the lighting device to a first lighting intensity level. The lighting element may be, for example, a single variable intensity bulb or a set of two or more different bulbs. The first lighting intensity level may be, for example, a predefined minimum lighting intensity output level. Then, the data processing system receives information regarding an approaching object from a peer lighting device within a plurality of peer lighting devices associated with the lighting device. The data processing system determines whether the approaching object is within a lighting interval of the lighting device based on the information regarding the approaching object received from the peer lighting device. In response to the data processing system determining that the approaching object is within the lighting interval of the lighting device based on the information regarding the approaching object received from the peer lighting device, the data processing system sets the lighting intensity level of the lighting element to a second lighting intensity level. The second lighting intensity level may be, for example, a predefined maximum lighting intensity level. Alternatively, the second lighting intensity level may be set at any level between the predefined minimum and maximum lighting intensity levels. Further, illustrative embodiments may utilize any and all lighting intensity levels between the predefined minimum lighting intensity level and the predefined maximum lighting intensity level.

With reference now to FIG. 3, a diagram illustrating an example of a lighting system is depicted in accordance with an illustrative embodiment. Lighting system 300 may be implemented, for example, in network data processing system 100 in FIG. 1. Lighting system 300 is a network of a plurality of lighting devices that emit light at a plurality of different lighting intensity output levels along a defined pathway based on input data provided by sensors associated with the plurality of lighting devices and/or data provided by peer lighting devices within the plurality of lighting devices.

Lighting system 300 includes lighting utility service server 302, lighting device 304, lighting device 306, lighting device 308, and pathway 310. Lighting utility service server 302 may be, for example, server 104 in FIG. 1. Lighting utility service server 302 monitors and controls lighting that is provided by lighting device 304, lighting device 306, and lighting device 308. Lighting utility service server 302 also may provide information, such as boot files, operating system images, and applications to lighting device 304, lighting device 306, and lighting device 308. Lighting device 304, lighting device 306, and lighting device 308 are clients to lighting utility service server 302.

Lighting device 304, lighting device 306, and lighting device 308 emit light at variable lighting intensity output levels along pathway 310. Lighting device 304, lighting device 306, and lighting device 308 may utilize a single variable intensity bulb configuration, a multi-bulb configuration that includes a plurality of different bulbs with different lighting intensity outputs, or a combination thereof. Lighting device 304, lighting device 306, and lighting device 308 include sensors 312. Sensors 312 are external sensors. External meaning that the sensors are located on an exterior surface of the lighting device's housing. Lighting device 304, lighting device 306, and lighting device 308 use sensors 312 to detect environmental conditions along pathway 310. Environmental conditions may include, for example, data regarding ambient light levels at different locations along pathway 310 and data regarding an approaching object, such as object 314 or object 316 traveling along pathway 310. In this example, object 314 is a vehicle and object 316 is a pedestrian. Also, pathway 310 is a street that includes a sidewalk. However, it should be noted that pathway 310 may be any type of pathway that can accommodate any type of land, water, or air vehicle.

In this example, lighting device 304, lighting device 306, and lighting device 308 are included within one lighting segment in a plurality of lighting segments of lighting system 300. A lighting segment is a set of one or more lighting devices that illuminate a defined area of pathway 310. The number of lighting devices within a particular lighting segment and the size of the defined area illuminated by that particular lighting segment may be defined by, for example, a system administrator of lighting system 300. Also, the system administrator may define the number of lighting segments within lighting system 300.

Lighting utility service server 302, lighting device 304, lighting device 306, and lighting device 308 are connected together via communications link 318. In this example, communications link 318 is a wired communications link. However, it should be noted that communications link 318 may be a wireless communication link or a combination of wired and wireless communication links. Further, communications link 318 provides peer-to-peer communication between lighting device 304, lighting device 306, and lighting device 308 via a peer-to-peer communication protocol.

Each of lighting devices 304-308 may transmit approaching object information, such as approaching object information 320, to peer lighting devices in the lighting segment that are in a same direction of travel as an approaching object, such as direction of travel 322 of object 314. Approaching object information 320 may include, for example, direction of travel of the approaching object, speed of travel of the approaching object, distance from a particular lighting device, and a current ambient light level detected by the particular lighting device.

The current ambient light level detected by a particular lighting device may include light produced by the headlights of one or more vehicles in a defined area associated with that particular lighting device, such as light 330 produced by headlights 332 of object 314 in a defined area associated with lighting device 304. Lighting device 304 will automatically adjust its lighting intensity output level based on the type and amount of light produced by the vehicles. For example, if there are 30 vehicles clustered together on pathway 310, then the light produced by the 30 vehicles will increase the current light level under lighting device 304. As a result, lighting device 304 may be able to decrease its lighting intensity output level while still maintaining a predefined minimum safe lighting level within the area.

Also, if a vehicle has a cold versus a warm light, such as, for example, an LED versus a halogen light, lighting device 304 may compliment that color temperature, which is typically 2700 Kelvin (K) to 4000K, to provide an optimal lighting temperature or intensity level. Color temperature of a bulb or lamp describes how the light appears when the human eye looks directly at the illuminated bulb. A light bulb that produces light perceived as yellowish white will have a color temperature of around 2700K. As the color temperature increases to 3000K-3500K, the color of the light appears less yellow and more white. In addition, lighting device 304 may mix different types of light, such as, for example, compact fluorescent lamp (CFL), incandescent, high pressure sodium, et cetera, in the right amounts in a multi-bulb configuration to produce the optimal lighting temperature or intensity level.

Moreover, lighting device 304 may utilize stored historical data of lighting temperature or intensity levels, which produced the least number of accidents in the area of lighting device 304, to produce the optimal lighting temperature or intensity level for the area associated with lighting device 304. In other words, illustrative embodiments may decrease the risk of accidents by evaluating historical lighting and accident trends in different locations within a lighting system. For example, historical trends may indicate to illustrative embodiments that accidents between 7 p.m. and 9 p.m. at a particular location within the lighting system occur 80% of the time when the lighting intensity output level of lighting devices in that particular location is below a determined level or that accidents between 4:30 a.m. and 5:30 am. in the eastbound lane of a particular stretch of road with vehicles having 3500K temperature lights occur three times more frequently than vehicles having 2700K temperature lights. As a result, illustrative embodiments will adjust the lighting intensity output levels and/or lighting temperature levels of the lighting devices associated with these particular areas accordingly to produce a determined safe level of lighting for each of these particular areas.

Further, each of lighting devices 304-308 has an associated lighting interval. For example, lighting device 304 is associated with lighting interval 324, lighting device 306 is associated with lighting interval 326, and lighting device 308 is associated with lighting interval 328. A lighting interval is a duration of time that a bulb or a plurality of bulbs within a lighting device are set to an increased lighting intensity output level based on a calculated speed of travel of an approaching object.

In this example, lighting device 304 increases its lighting intensity output level to a predefined maximum output level when object 314 enters lighting interval 324. In addition, lighting device 304 may send approaching object information 320 to peer lighting device 306. Then, lighting device 306 increases its lighting intensity output level to a predefined maximum output level when object 314 enters lighting interval 326 while lighting device 304 decreases its lighting intensity output level to a predefined minimum output level after vehicle 304 leaves lighting interval 324 or when a lighting time out time associated with lighting interval 324 has been reached. Then, lighting device 308 increases its lighting intensity output level to a predefined maximum output level when object 314 enters lighting interval 328 while lighting device 306 decreases its lighting intensity output level to a predefined minimum output level after vehicle 304 leaves lighting interval 326 and while lighting device 304 decreases its lighting intensity output level to a zero output level after vehicle 304 leaves lighting interval 326. As a result, lighting devices 304-308 produce a rolling window of light in direction of travel 322 for object 314 as object 314 travels along pathway 310 using information obtained by sensors 312 and/or approaching object information 320 provided by peer lighting devices.

Figure 4:
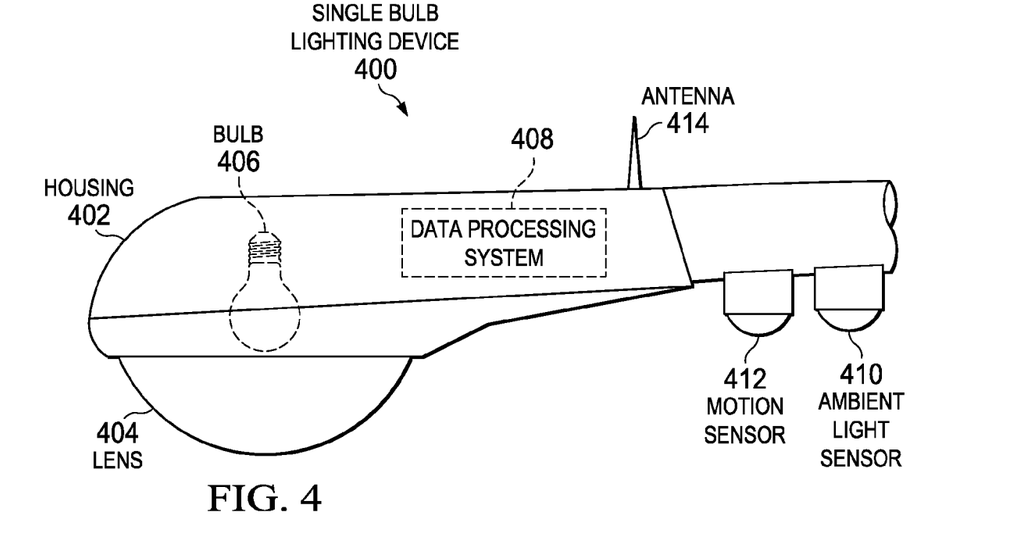
FIG. 4 is a diagram illustrating an example of a single bulb lighting device in accordance with an illustrative embodiment.

With reference now to FIG. 4, a diagram illustrating an example of a single bulb lighting device is depicted in accordance with an illustrative embodiment. Single bulb lighting device 400 may be implemented in, for example, lighting device 304 in FIG. 3. Single bulb lighting device 400 is an example of a lighting device that emits a plurality of different lighting intensity output levels using a single variable intensity bulb.

Single bulb lighting device 400 includes housing 402, lens 404, bulb 406, data processing system 408, ambient light sensor 410, motion sensor 412, and antenna 414. Housing 402 is a mechanical casing that supports and protects the components of single bulb lighting device 400. Lens 404 evenly diffuses the light emitted by bulb 406. Alternatively, lens 404 may collimate or focus the light emitted by bulb 406.

Bulb 406 is a variable intensity lighting element capable of emitting a plurality of different lighting intensity output levels, such as, for example, a 3-way light bulb or a lighting element controlled by a rheostat. Data processing system 408 may be, for example, data processing system 200 in FIG. 2. Data processing system 408 controls operation of single bulb lighting device 400. In other words, data processing system 408 controls the lighting intensity output level of bulb 406. Data processing system 408 controls the lighting intensity output level of bulb 406 using data obtained from ambient light sensor 410, motion sensor 412, and/or antenna 414. Data processing system 408 uses the data provided by ambient light sensor 410, motion sensor 412, and/or antenna 414 to determine the current environmental conditions around single bulb lighting device 400. Data processing system 408 then uses the current environmental conditions data to determine the correct lighting intensity output level of bulb 406 based on the current environmental conditions.

Ambient light sensor 410 and motion sensor 412 may be, for example, sensors 312 in FIG. 3. Ambient light sensor 410 detects the amount of light around single bulb lighting device 400, which may include light produced naturally and light produced by one or more approaching objects, such as light produced by oncoming headlights of vehicles. Motion sensor 412 may be, for example, an infra-red motion sensor that detects the movement of an approaching object, such as object 314 in FIG. 3. Antenna 414 wirelessly receives approaching vehicle data from peer lighting devices associated with single bulb lighting device 400.

Figure 5:
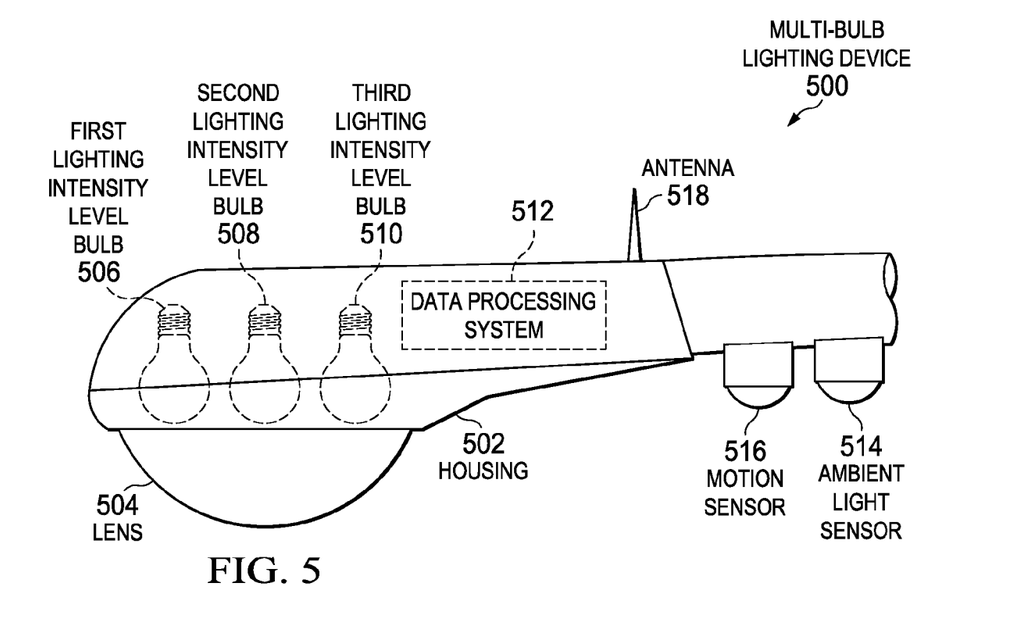
FIG. 5 is a diagram illustrating an example of a multi-bulb lighting device in accordance with an illustrative embodiment.

With reference now to FIG. 5, a diagram illustrating an example of a multi-bulb lighting device is depicted in accordance with an illustrative embodiment. Multi-bulb lighting device 500 may be implemented in, for example, lighting device 304 in FIG. 3. Multi-bulb lighting device 500 is an example of a lighting device that emits a plurality of different lighting intensity output levels using a plurality of different bulbs with different lighting intensity output levels or using a plurality of a same intensity bulb and turning on different numbers of the plurality of the same intensity bulb.

Multi-bulb lighting device 500 includes housing 502, lens 504, first lighting intensity level bulb 506, second lighting intensity level bulb 508, third lighting intensity level bulb 510, data processing system 512, ambient light sensor 514, motion sensor 516, and antenna 518. Housing 502 may be, for example, housing 402 in FIG. 4. Housing 502 supports and protects the components of multi-bulb lighting device 500. Lens 504 may be, for example, lens 404 in FIG. 4. Depending on the illustrative embodiment, lens 504 may either diffuse or collimate the light emitted by first lighting intensity level bulb 506, second lighting intensity level bulb 508, third lighting intensity level bulb 510, or any combination thereof.

First lighting intensity level bulb 506, second lighting intensity level bulb 508, and third lighting intensity level bulb 510 represent a plurality of different bulbs capable of emitting a plurality of different lighting intensity output levels. Data processing system 512 may be, for example, data processing system 408. Data processing system 512 controls operation of multi-bulb lighting device 500. In other words, data processing system 408 controls which of first lighting intensity level bulb 506, second lighting intensity level bulb 508, third lighting intensity level bulb 510, or any combination thereof are turned on at any one time. Data processing system 512 uses data obtained from ambient light sensor 514, motion sensor 516, and/or antenna 518 to determine the current environmental conditions around multi-bulb lighting device 500. Data processing system 512 then uses the current environmental conditions data to determine which bulb or combination of bulbs to turn on to provide an optimal lighting intensity output level for the current environmental conditions.

Ambient light sensor 514 and motion sensor 516 may be, for example, ambient light sensor 410 and motion sensor 412 in FIG. 4. Ambient light sensor 514 detects the amount of light around multi-bulb lighting device 500 including naturally produced light and artificially produced light. The artificially produced light may be produced by, for example, headlights of one or more approaching vehicles. Motion sensor 516 detects the movement of approaching objects, such as object 314 in FIG. 3. Antenna 518 wirelessly receives approaching vehicle data from peer lighting devices associated with multi-bulb lighting device 500.

Figure 6A:
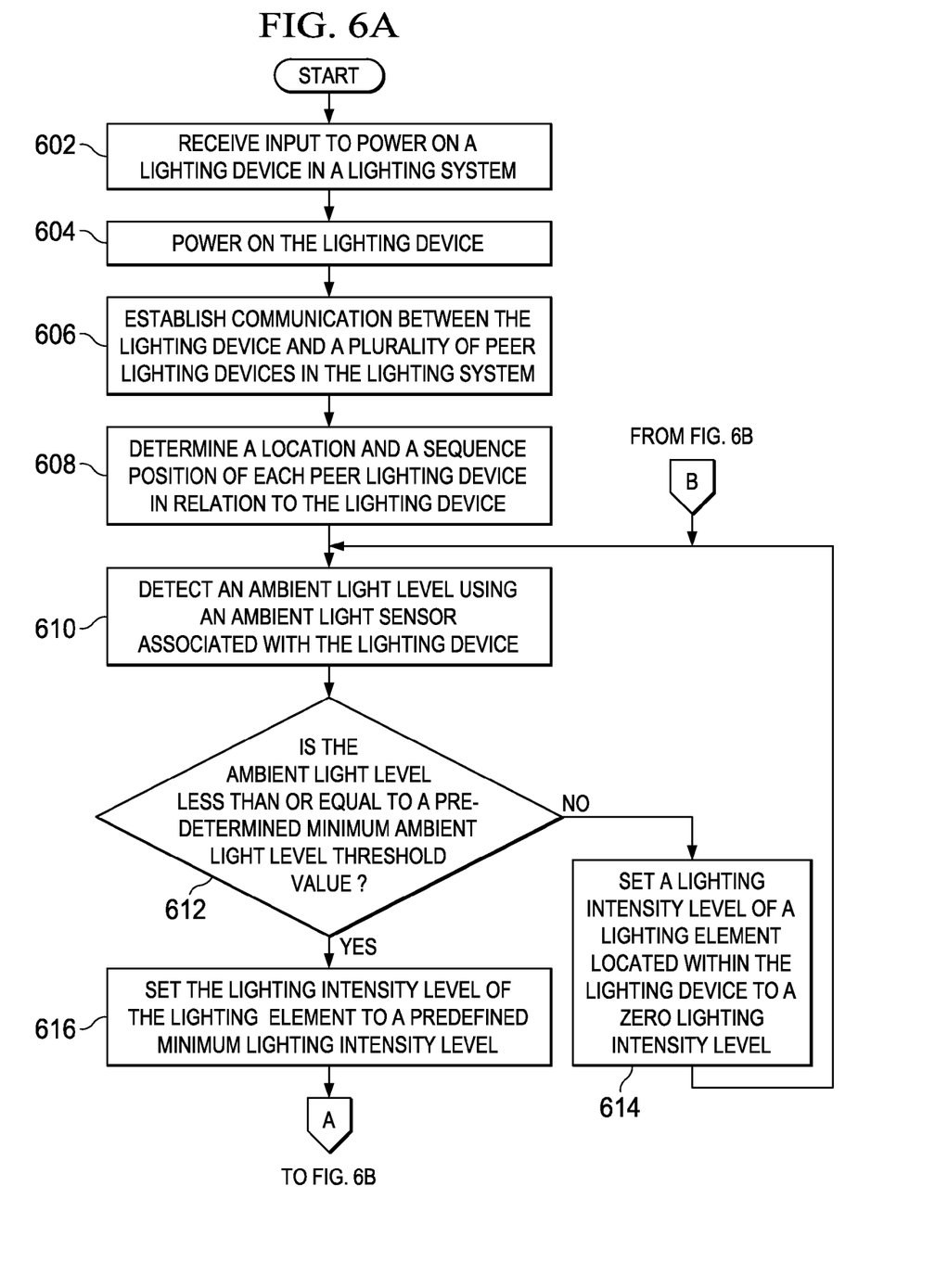
FIG. 6A and FIG. 6B are a flowchart illustrating a process for automatic intelligent and coordinated lighting of a lighting device in a lighting system in accordance with an illustrative embodiment.
Figure 6B:
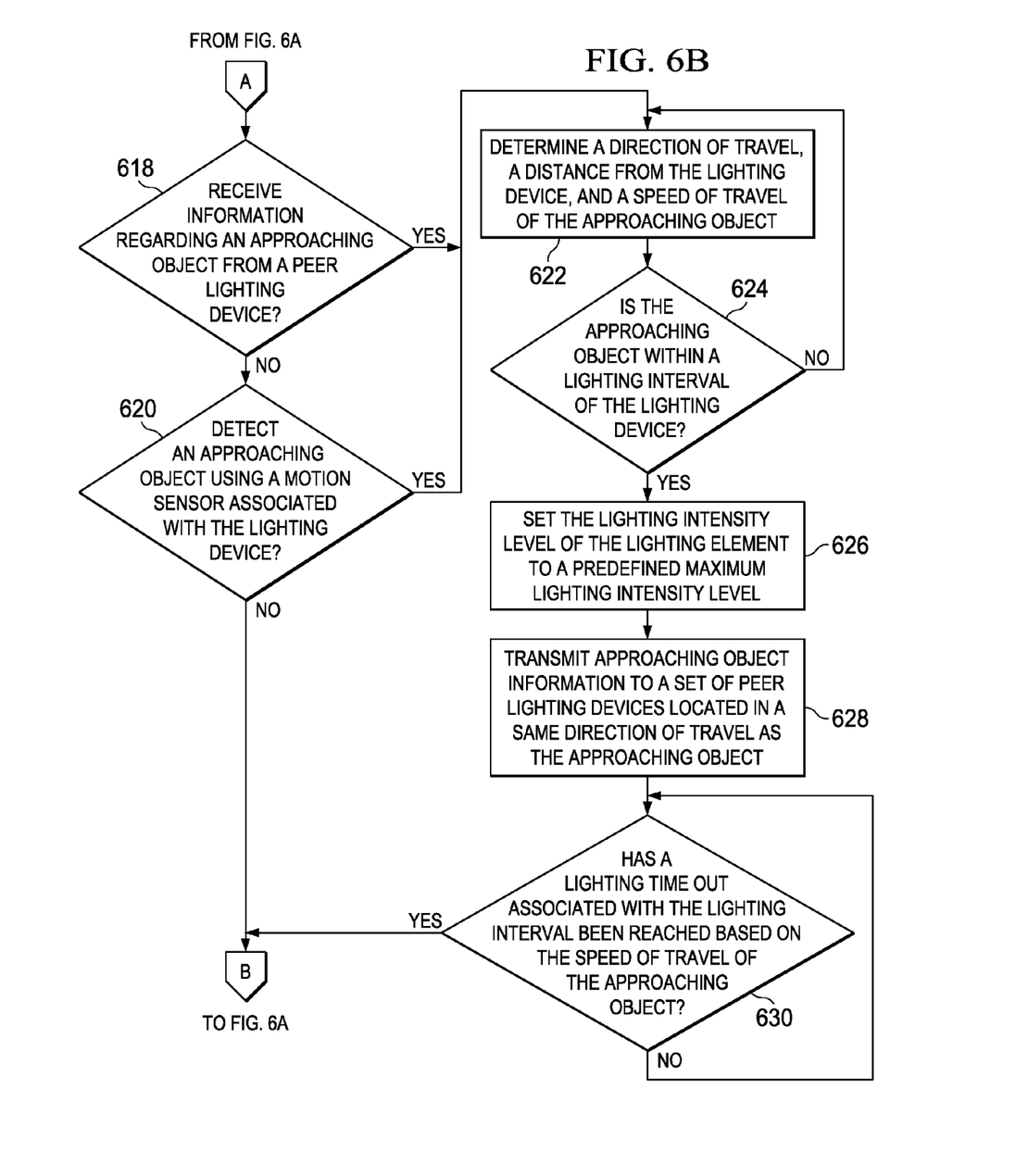

With reference now to FIG. 6A and FIG. 6B, a flowchart illustrating a process for automatic intelligent and coordinated lighting of a lighting device in a lighting system is shown in accordance with an illustrative embodiment. The process shown in FIG. 6A and FIG. 6B may be implemented in a data processing system, such as, for example, data processing system 408 in FIG. 4.

The process begins when the data processing system receives an input to power on a lighting device in a lighting system, such as lighting device 308 in lighting system 300 in FIG. 3 (step 602). Subsequently, the data processing system powers on the lighting device (step 604). In addition, the data processing system establishes communication between the lighting device and a plurality of peer lighting devices in the lighting system (step 606). The plurality of peer lighting devices may be, for example, lighting devices 304 and 306 associated with lighting device 308 in FIG. 3. Associated with means that the lighting devices are included in the same lighting segment in the lighting system. The communication between the lighting device and the plurality of peer lighting devices may be via, for example, a peer-to-peer communication protocol.

Further, the data processing system determines a location and a sequence position of each peer lighting device in relation to the lighting device (step 608). Furthermore, the data processing system detects an ambient light level using an ambient light sensor associated with the lighting device, such as ambient light sensor 410 in FIG. 4 (step 610). Then, the data processing system makes a determination as to whether the ambient light level is less than or equal to a predetermined minimum ambient light level threshold value (step 612).

If the data processing system determines that the ambient light level is not less than or equal to the predetermined minimum ambient light level threshold value, no output of step 612, then the data processing system sets a lighting intensity level of a lighting element located within the lighting device to a zero lighting intensity level (step 614). The lighting element may be, for example, bulb 406 in FIG. 4. Thereafter, the process returns to step 610 where the data processing system continues to detect the ambient light level around the lighting device.

If the data processing system determines that the ambient light level is less than or equal to the predetermined minimum ambient light level threshold value, yes output of step 612, then the data processing system sets the lighting intensity level of the lighting element to a predefined minimum lighting intensity level (step 616). The predefined minimum lighting intensity level may be set by, for example, a governmental agency concerned with public safety or concerned with energy conservation. Moreover, the data processing system makes a determination as to whether the data processing system has received information regarding an approaching object, such as object 314 in FIG. 3, from a peer lighting device (step 618).

If the data processing system determines that information regarding an approaching object has been received from a peer lighting device, yes output of step 618, then the process proceeds to step 622. If the data processing system determines that information regarding an approaching object has not been received from a peer lighting device, no output of step 618, then the data processing system makes a determination as to whether the data processing system detects an approaching object using a motion sensor associated with the lighting device, such as motion sensor 412 in FIG. 4 (step 620). If the data processing system determines that an approaching object is not detected by the motion sensor, no output of step 620, then the process returns to step 610 where the data processing system continues to detect the ambient light level around the lighting device. If the data processing system determines that an approaching object is detected by the motion sensor, yes output of step 620, then the data processing system determines a direction of travel, a distance from the lighting device, and a speed of travel of the approaching object (step 622).

Afterward, the data processing system makes a determination as to whether the approaching object within a lighting interval of the lighting device, such as lighting interval 324 in FIG. 3 (step 624). If the data processing system determines that the approaching object is not within the lighting interval of the lighting device, no output of step 624, then the process returns to step 622 where the data processing system continues to calculate the direction of travel, the distance from the lighting device, and the speed of travel of the approaching object. If the data processing system determines that the approaching object is within the lighting interval of the lighting device, yes output of step 624, then the data processing system sets the lighting intensity level of the lighting element to a predefined maximum lighting intensity level (step 626). The predefined maximum lighting intensity level of the lighting element may be defined by, for example, a manufacturer of the lighting element or an environmental agency.

In addition, the data processing system transmits approaching object information to a set of one or more peer lighting devices located in a same direction of travel as the approaching object (step 628). For example, lighting device 304 transmits approaching object information 320 to lighting device 306 in a same direction as direction of travel 322 of object 314 in FIG. 3. Subsequently, the data processing system makes a determination as to whether a lighting time out associated with the lighting interval has been reached based on the speed of travel of the approaching object (step 630). A lighting time out is an end of a defined period of time (i.e., the lighting interval) at which point a current lighting intensity level of the lighting device is decreased. If the data processing system determines that the lighting time out associated with the lighting interval has not been reached based on the speed of travel of the approaching object, no output of step 630, then the process returns to step 630 where the data processing system continues to wait for the lighting time out to be reached. If the data processing system determines that the lighting time out associated with the lighting interval has been reached based on the speed of travel of the approaching object, yes output of step 630, then the process returns to step 610 where the data processing system continues to detect the ambient light level around the lighting device.

Figure 7:
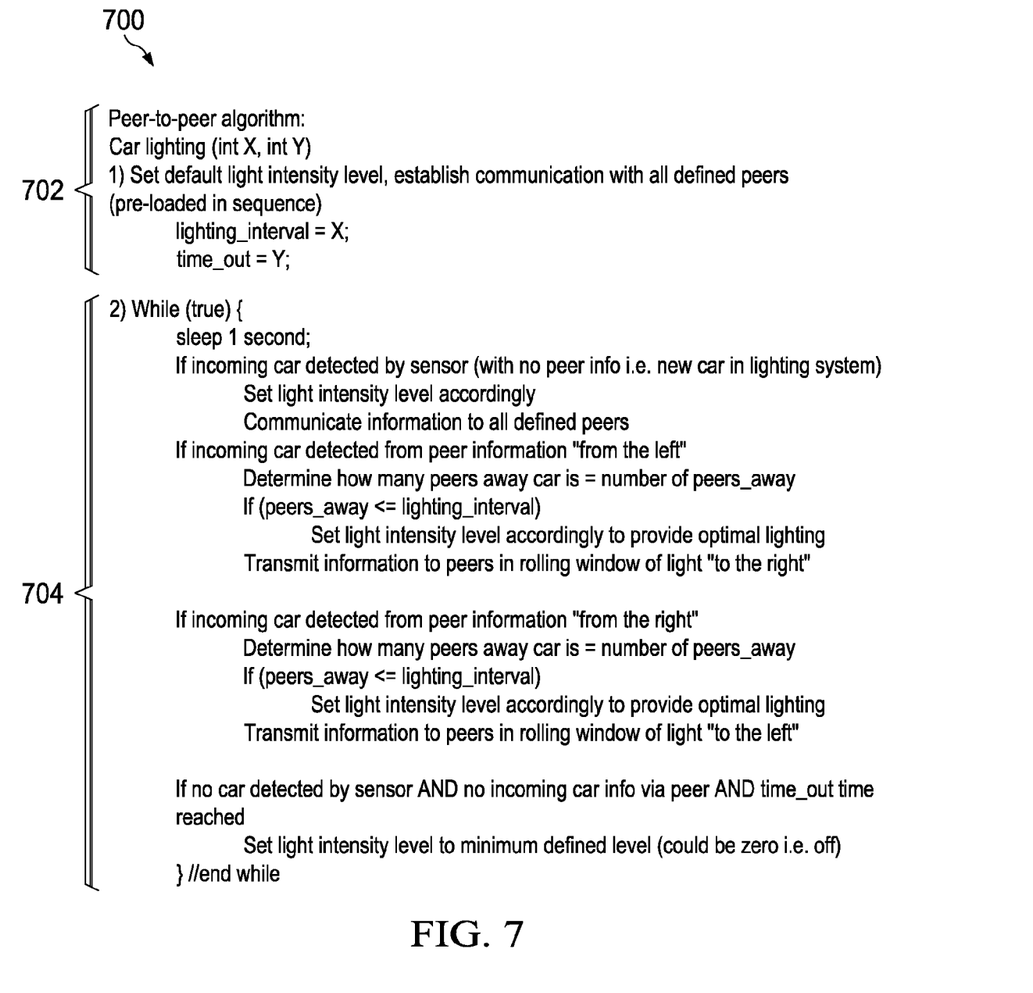
FIG. 7 is a specific example of a peer-to-peer algorithm in accordance with an illustrative embodiment.

With reference now to FIG. 7, a specific example of a peer-to-peer algorithm is depicted in accordance with an illustrative embodiment. Peer-to-peer algorithm 700 may be included in, for example, intelligent lighting program 218 in FIG. 2, and implemented in, for example, data processing system 408 in FIG. 4. Peer-to-peer algorithm 700 is a sequence of steps for setting a light intensity output level of a lighting device in a lighting system based on data obtained from one or more sensors and/or data obtained from one or more peer lighting devices. The lighting device in the lighting system may be, for example, lighting device 308 in lighting system 300 in FIG. 3, the sensors may be, for example, sensors 312 in FIG. 3, and the peer lighting devices may be, for example, lighting devices 304 and 306 in FIG. 3.

Peer-to-peer algorithm 700 includes step 702 and step 704. In step 702, peer-to-peer algorithm 700 sets the lighting intensity output level of the lighting device at a default level. The default level may be, for example, a predefined minimum lighting intensity output level. Also in step 702, peer-to-peer algorithm 700 establishes communication with all defined peer lighting devices in a same lighting segment of the lighting system. The communication between the lighting device and all defined peer lighting devices may be via, for example, a peer-to-peer communication protocol.

In step 704, peer-to-peer algorithm 700 determines if an incoming car, such as object 314 in FIG. 3, is detected by a sensor with no incoming car information, such as approaching object information 320 in FIG. 3, being received from a peer lighting device. If this is the case, peer-to-peer algorithm 700 determines that a new car has entered the lighting system. Accordingly, peer-to-peer algorithm 700 sets the lighting intensity output level at a higher level and communications all this information to all of the defined peer lighting devices.

Also in step 704, peer-to-peer algorithm 700 determines if an incoming car is detected from incoming car information received from one or more peer lighting devices "from the left." If incoming car information is received from one or more peer lighting devices from the left, peer-to-peer algorithm 700 determines the number of peer lighting devices away the car is. If the number of peer lighting devices is less than or equal to the lighting interval associated with the lighting device, peer-to-peer algorithm 700 sets the lighting intensity level at a higher level and transmits all this information to all of the defined peer lighting devices in a rolling window of light "to the right."

Further in step 704, peer-to-peer algorithm 700 determines if an incoming car is detected from incoming car information received from one or more peer lighting devices "from the right." If incoming car information is received from one or more peer lighting devices from the right, peer-to-peer algorithm 700 determines the number of peer lighting devices away the car is. If the number of peer lighting devices is less than or equal to the lighting interval associated with the lighting device, peer-to-peer algorithm 700 sets the lighting intensity level at a higher level and transmits all this information to all of the defined peer lighting devices in a rolling window of light "to the left."

Further in step 704, if peer-to-peer algorithm 700 determines that no car is detected by a sensor associated with the lighting device AND no incoming car information is received from one or more peer lighting devices AND a time out time associated with the lighting interval has been reached, then peer-to-peer algorithm 700 sets the lighting intensity output level at the predefined minimum lighting intensity output level. Alternatively, peer-to-peer algorithm 700 may set the lighting intensity output level at a zero lighting intensity output level at this point.

Thus, illustrative embodiments of the present invention provide a method, data processing system, and computer program product for automatic intelligent and coordinated lighting of a lighting device in a lighting system. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for lighting a lighting device, the method comprising:

responsive to determining, by a data processing system located in the lighting device, that an ambient light level is less than or equal to a predetermined minimum ambient light level threshold value, setting, by the data processing system, a lighting intensity level of a lighting element located in the lighting device to a first lighting intensity level, wherein the lighting element includes a plurality of different types of lighting intensity level bulbs, each bulb in the plurality of different types of lighting intensity level bulbs emits a different type of light at a different lighting intensity output level, and wherein each bulb in the plurality of different types of lighting intensity level bulbs produces a different color temperature;

receiving, by the data processing system, information regarding an approaching object from a peer lighting device within a plurality of peer lighting devices associated with the lighting device;

determining, by the data processing system, whether the approaching object is within a lighting interval of the lighting device based on the information regarding the approaching object received from the peer lighting device;

responsive to determining, by the data processing system, that the approaching object is within the lighting interval of the lighting device based on the information regarding the approaching object received from the peer lighting device, setting, by the data processing system, the lighting intensity level of the lighting element to a second lighting intensity level; and selecting, by the data processing system, a set of one or more bulbs in the plurality of different types of lighting intensity level bulbs to complement a color temperature produced by the approaching object.

2. The method of claim 1, further comprising:

determining, by the data processing system, a location and a sequence position of each peer lighting device in the plurality of peer lighting devices in relation to the lighting device; and transmitting, by the data processing system, approaching object information to a set of peer lighting devices located in a same direction of travel as the approaching object.

3. The method of claim 2, wherein the approaching object information is transmitted from the lighting device to the set of peer lighting devices via a peer-to-peer communication protocol.

4. The method of claim 1, further comprising:

detecting, by the data processing system, the approaching object using a motion sensor associated with the lighting device; and determining, by the data processing system, a direction of travel, a distance from the lighting device, and a speed of travel of the approaching object using data obtained by the motion sensor.

5. The method of claim 4, further comprising:

determining, by the data processing system, whether a lighting time out associated with the lighting interval has been reached based on the speed of travel of the approaching object; and responsive to determining, by the data processing system, that a lighting time out associated with the lighting interval has been reached based on the speed of travel of the approaching object, setting, by the data processing system, the lighting intensity level of the lighting element to one of the first lighting intensity level or a third lighting intensity level.

6. The method of claim 5, wherein the first lighting intensity level of the lighting element is a predefined minimum lighting intensity level, and wherein the second lighting intensity level of the lighting element is a predefined maximum lighting intensity level, and wherein the third lighting intensity level of the lighting element is a zero lighting intensity level.

7. The method of claim 1, wherein the ambient light level is a current level of light surrounding the lighting device, and wherein the current level of light includes light produced by objects in an area associated with the lighting device, and wherein the ambient light level is detected by an ambient light level sensor associated with the lighting device.

8. The method of claim 1, wherein the approaching object is one of a vehicle or a pedestrian.

9. The method of claim 1, wherein the approaching object travels along a pathway, and wherein the lighting device and the plurality of peer lighting devices are located adjacent to the pathway.

10. The method of claim 1, wherein the lighting interval is a duration of time that the lighting element is set to an increased lighting intensity level based on a calculated speed of travel of the approaching object.

11. The method of claim 1, further comprising:
selecting, by the data processing system, a bulb in the plurality of different types of lighting intensity level bulbs based on a least energy cost for an expected duration of burn.

12. A data processing system for lighting a lighting device, the data processing system comprising:
a bus system;
a storage device connected to the bus system, wherein the storage device stores computer readable program code; and
a processor connected to the bus system, wherein the processor executes the computer readable program code to set a lighting intensity level of a lighting element located in a lighting device to a first lighting intensity level in response to determining that an ambient light level is less than or equal to a predetermined minimum ambient light level threshold value, wherein the lighting element includes a plurality of different types of lighting intensity level bulbs, each bulb in the plurality of different types of lighting intensity level bulbs emits a different type of light at a different lighting intensity output level, and wherein each bulb in the plurality of different types of lighting intensity level bulbs produces a different color temperature; receive information regarding an approaching object from a peer lighting device within a plurality of peer lighting devices associated with the lighting device; determine whether the approaching object is within a lighting interval of the lighting device based on the information regarding the approaching object received from the peer lighting device; set the lighting intensity level of the lighting element to a second lighting intensity level in response to determining that the approaching object is within the lighting interval of the lighting device based on the information regarding the approaching object received from the peer lighting device; and select a set of one or more bulbs in the plurality of different types of lighting intensity level bulbs to complement a color temperature produced by the approaching object.

13. The data processing system of claim 12, wherein the processor further executes the computer readable program code to determine a location and a sequence position of each peer lighting device in the plurality of peer lighting devices in relation to the lighting device; and transmit approaching object information to a set of peer lighting devices located in a same direction of travel as the approaching object.

14. A computer program product stored on a non-transitory computer readable storage device having computer readable program code embodied thereon that is executable by a data processing system for lighting a lighting device, the computer program product comprising:
computer readable program code for setting a lighting intensity level of a lighting element located in a lighting device to a first lighting intensity level in response to determining that an ambient light level is less than or equal to a predetermined minimum ambient light level threshold value, wherein the lighting element includes a plurality of different types of lighting intensity level bulbs, each bulb in the plurality of different types of lighting intensity level bulbs emits a different type of light at a different lighting intensity output level, and wherein each bulb in the plurality of different types of lighting intensity level bulbs produces a different color temperature;
computer readable program code for receiving information regarding an approaching object from a peer lighting device within a plurality of peer lighting devices associated with the lighting device;
computer readable program code for determining whether the approaching object is within a lighting interval of the lighting device based on the information regarding the approaching object received from the peer lighting device;
computer readable program code for setting the lighting intensity level of the lighting element to a second lighting intensity level in response to determining that the approaching object is within the lighting interval of the lighting device based on the information regarding the approaching object received from the peer lighting device; and
computer readable program code for selecting a set of one or more bulbs in the plurality of different types of lighting intensity level bulbs to complement a color temperature produced by the approaching object.

15. The computer program product of claim 14, further comprising:
computer readable program code for determining a location and a sequence position of each peer lighting device in the plurality of peer lighting devices in relation to the lighting device; and
computer readable program code for transmitting approaching object information to a set of peer lighting devices located in a same direction of travel as the approaching object.

16. The computer program product of claim 15, wherein the approaching object information is transmitted from the lighting device to the set of peer lighting devices via a peer-to-peer communication protocol.

17. The computer program product of claim 14, further comprising:
computer readable program code for detecting the approaching object using a motion sensor associated with the lighting device; and
computer readable program code for determining a direction of travel, a distance from the lighting device, and a speed of travel of the approaching object using data obtained by the motion sensor.

18. The computer program product of claim 17, further comprising:
computer readable program code for determining whether a lighting time out associated with the lighting interval has been reached based on the speed of travel of the approaching object; and
computer readable program code for setting the lighting intensity level of the lighting element to one of the first lighting intensity level or a third lighting intensity level in response to determining that a lighting time out associated with the lighting interval has been reached based on the speed of travel of the approaching object.

19. The computer program product of claim 18, wherein the first lighting intensity level of the lighting element is a predefined minimum lighting intensity level, and wherein the second lighting intensity level of the lighting element is a predefined maximum lighting intensity level, and wherein the third lighting intensity level of the lighting element is a zero lighting intensity level.

* * * * *